US007233799B2

(12) United States Patent
Spain, Jr.

(10) Patent No.: US 7,233,799 B2
(45) Date of Patent: Jun. 19, 2007

(54) LOCATION ESTIMATION OF WIRELESS TERMINALS BASED ON COMBINATIONS OF SIGNAL STRENGTH MEASUREMENTS AND GEOMETRY-OF-ARRIVAL MEASUREMENTS

(75) Inventor: David Stevenson Spain, Jr., Portola Valley, CA (US)

(73) Assignee: Polaris Wireless, Inc., Santa Clara, CA (US)

( * ) Notice: Subject to any disclaimer, the term of this patent is extended or adjusted under 35 U.S.C. 154(b) by 0 days.

(21) Appl. No.: 10/751,790

(22) Filed: Jan. 5, 2004

(65) Prior Publication Data

US 2004/0180671 A1 Sep. 16, 2004

Related U.S. Application Data

(60) Provisional application No. 60/488,855, filed on Jul. 19, 2003, provisional application No. 60/461,219, filed on Apr. 8, 2003, provisional application No. 60/449,569, filed on Feb. 24, 2003.

(51) Int. Cl.
*H04Q 7/20* (2006.01)
(52) U.S. Cl. .................. 455/456.1; 455/456.6
(58) Field of Classification Search ............. 455/456.1, 455/456.2, 456.3, 457, 456.4, 456.7, 456.6
See application file for complete search history.

(56) References Cited

U.S. PATENT DOCUMENTS 5,293,642 A * 3/1994 Lo ............................ 455/456.2
5,404,376 A * 4/1995 Dent ........................... 375/138
6,195,556 B1 * 2/2001 Reudink et al. .......... 455/456.2
6,236,849 B1    5/2001 Reudink et al.
6,249,252 B1 * 6/2001 Dupray ....................... 342/450
2003/0129992 A1 * 7/2003 Koorapaty et al. ......... 455/456

FOREIGN PATENT DOCUMENTS

GB    2352134 A   * 1/2001

OTHER PUBLICATIONS

Cong et al., Hybrid TDOA/AOA Mobile user Location for Wideband CDMA Cellular Systems, IEEE Transactions on Wireless Communications, IEEE, Jul. 2002, pp. 439-447, vol. 1, No. 3.

* cited by examiner

*Primary Examiner*—William Trost
*Assistant Examiner*—Marivelisse Santiago-Cordero
(74) *Attorney, Agent, or Firm*—DeMont & Breyer LLC

(57) ABSTRACT

A method and apparatus for estimating the location of a wireless terminal are disclosed. The location of the wireless terminal is estimated based on one or more signal strength measurements in conjunction with: (i) one or more angle-of-arrival measurements, (ii) one or more time-of-arrival measurements, or (iii) a combination of (i) and (ii). At each measurement time, the illustrative embodiment (a) determines the candidate locations for the wireless terminal, (b) computes a measurement likelihood function for any signal strength measurements that are available at that time, (c) computes a measurement likelihood function for any geometry-of-arrival measurements that are available at that time, (d) computes a joint likelihood function for all measurements available at that time, and (e) updates the location probability distribution for the wireless terminal with the joint measurement likelihood function. Estimates of the location of the wireless terminal are obtained from the location probability distribution.

4 Claims, 12 Drawing Sheets

LOCATION ESTIMATION OF WIRELESS TERMINALS BASED ON COMBINATIONS OF SIGNAL STRENGTH MEASUREMENTS AND GEOMETRY-OF-ARRIVAL MEASUREMENTS

CROSS-REFERENCE TO RELATED APPLICATION

This application claims the benefit of:
(i) U.S. provisional application Ser. No. 60/461,219, filed Apr. 8, 2003, entitled "Location Estimation of Wireless Terminals Based on Combinations of Signal Strength Measurements, Angle-of-Arrival Measurements, and Time-Difference-of-Arrival Measurements,"
(ii) U.S. provisional application Ser. No. 60/449,569, filed Feb. 24, 2003, entitled "Location Estimation of Wireless Terminals Based on Combinations of Signal Strength Measurements, Angle-of-Arrival Measurements, and Time-Difference-of-Arrival Measurements,"
(iii) U.S. provisional application Ser. No. 60/488,855, filed Jul. 19, 2003, entitled "Location Estimation of Wireless Terminals Based on Combinations of Signal Strength Measurements, Angle-of-Arrival Measurements, and Time-Difference-of-Arrival Measurements,"

all of which are incorporated by reference.

The underlying concepts, but not necessarily the nomenclature, of the following applications are incorporated by reference:
(i) U.S. Pat. No. 6,269,246, issued 31 Jul. 2001;
(ii) U.S. Pat. No. 6,393,294, issued 21 May 2002;
(iii) U.S. patent application Ser. No. 09/532,418, filed 22 Mar. 2000;
(iv) U.S. patent application Ser. No. 10/128,128, filed 22 Apr. 2002; and
(v) U.S. patent application Ser. No. 10/299,398, filed 18 Nov. 2002; and
(vi) U.S. patent application Ser. No. 10/357,645, filed 4 Feb. 2003, entitled "Location Estimation of Wireless Terminals Though Pattern Matching of Signal Strength Differentials".

FIELD OF THE INVENTION

The present invention relates to telecommunications in general, and, more particularly, to a technique for estimating the location of a wireless terminal.

BACKGROUND OF THE INVENTION

A wireless terminal measures and reports the signal strength of its serving cell and some number of neighboring cells as part of the handoff process. The frequency of these reports, the number of neighboring cells monitored by the wireless terminal, and the reporting criteria depend on the air interface protocol of the cellular network (e.g., IS-136, GSM, IS-95 CDMA, etc.). Since each cell in the network transmits a constant control signal, the strength of this signal at the wireless terminal is an indication of the distance from the cell's antenna to the wireless terminal. Thus, it is possible to derive an estimate of the location of the wireless terminal from the strength of the signals that it reports by comparing the reported signal strengths to a model of the signal environment.

The accuracy of the location estimates that can be obtained from reported signal strength measurements depends on many factors that can vary from location to location and include, for example:
the number of signal strength measurements reported;
the accuracy with which the wireless terminal can measure signal strength;
the accuracy with which the wireless terminal can report signal strength values to the switching center (i.e., quantization);
the accuracy of the signal strength model of the environment; and
local attenuation caused by obstructions (e.g., terrain, vehicles, trees, etc.).

In addition, the accuracy of location estimates based on signal strength measurements also depends on the sensitivity of the signal environment to changes in location. For example, if there is a region in which received signal strength is relatively insensitive to changes in location, then reported signal strength measurements at a wireless terminal in that region could result in a relatively inaccurate location estimate, even if the model of the signal environment were perfect. Consequently, estimates based on signal strength measurements alone might not be sufficiently accurate for a specific location-based application at all locations within a service area.

SUMMARY OF THE INVENTION

The present invention enables the location of a wireless terminal to be estimated based on one or more signal strength measurements in conjunction with one or more geometry-of-arrival measurements, where geometry-of-arrival measurements comprise:
i. angle-of-arrival measurements, each of which corresponds, for example, to a respective signal transmitted by the wireless terminal, and
ii. time-of-arrival measurements, each of which corresponds, for example, to a respective signal transmitted by, or received by, the wireless terminal.

With this invention, any number of signal strength measurements may be supplemented with any mixture of geometry-of-arrival measurements to achieve a more accurate location estimate than could be achieved with either the signal strength measurements or the geometry-of-arrival measurements alone.

It should be noted that the so-called time-difference-of-arrival measurement is simply the difference of two time-of-arrival measurements with respect to a common signal event. A time-difference-of-arrival measurement may be formed when a signal transmitted by the wireless terminal is received at two spatially distinct receivers or when two time-tagged signals transmitted by two spatially distinct transmitters are received by the wireless terminal (the Global Positioning System, or GPS, is an example of the latter). The differencing operation eliminates any timing errors that are common to both time-of-arrival measurements. Thus, time-difference-of-arrival is not a separate type of measurement, but simply a calculation based on two time-of-arrival measurements.

The accuracy of any location information that can be derived from a single time-of-arrival measurement depends on how accurately the clocks at the transmitter and receiver are calibrated with respect to one another and how accurately the time-of-arrival can be measured at the receiver. Of course, multiple time-of-arrival measurements require multiple transmitters and a single receiver (as in GPS) or a single transmitter and multiple receivers. In this case, the accuracy of any derived location information depends on how accurately all of the transmitter/receiver clocks are calibrated with respect to one another.

The accuracy of any location information derived from a single angle-of-arrival measurement depends on how accurately the angle-of-arrival can be measured and how far the transmitter is from the angle-of-arrival sensor.

Of course, given a sufficient number of geometry-of-arrival measurements, the location of the wireless terminal could be estimated by solving a system of equations that are based on standard analytic geometry and well-known in the art. However, without a sufficient number of such geometry-of-arrival measurements, the location of the wireless terminal cannot be estimated from the geometry-of-arrival measurements alone, because there are fewer equations than quantities to be estimated. Even with a sufficient number of geometry-of-arrival measurements to derive a location estimate, the location accuracy depends on the relative placement of the sensors. For example, for two angle-of-arrival sensors that are close together relative to the distance from the sensors to the wireless terminal, the estimated distance is very sensitive to angle measurement errors.

The number of geometry-of-arrival measurements might be insufficient for a variety of reasons. For example, the geographic placement of additional sensors might be too sparse to provide sufficiently precise signal measurements; a physical obstruction (e.g., skyscraper, tree, etc.) might prevent the wireless terminal from receiving one or more GPS signals; or a physical obstruction might prevent a sensor from receiving one or more signals transmitted by the wireless terminal This invention supplements the signal strength measurements normally reported by the wireless handset with geometry-of-arrival measurements to enable the composite location system to achieve the desired location accuracy everywhere in the service area when (a) the signal strength measurements alone cannot achieve the desired accuracy and (b) the geometry-of-arrival measurements alone are not sufficient to derive a location estimate. Furthermore, for cases in which either (a) or (b) alone might be sufficient for obtaining an estimate of the wireless terminal's location with the desired accuracy, the combination of (a) and (b) will result in an even more accurate estimate. Consequently, the illustrative embodiment employs additional sensors where needed to improve the baseline accuracy of the signal strength-based location system. By judiciously locating the additional sensors in this manner, the composite system can provide a cost-effective solution for achieving desired capability and accuracy everywhere in the service area.

The illustrative embodiment of the present invention uses all of the available data (signal strength measurements and geometry-of-arrival measurements) to create a single location probability distribution from which a location estimate may be derived. Because this invention calculates the location probability distribution, it is always possible to calculate a location estimate (and its associated uncertainty), regardless of the number of measurements. By contrast, approaches which depend on solving a set of algebraic equations based on geometry-of-arrival measurements cannot provide any location estimate until a sufficient number of such measurements is available.

The illustrative embodiment comprises: (i) receiving a set of signal strengths as measured by the wireless terminal and one or more geometry-of-arrival measurements produced either by the wireless terminal or by one or more external receivers, (ii) creating a location probability distribution from the signal strength measurements, (iii) modifying the location probability distribution with the geometry-of-arrival measurements, and (iv) using the resulting location probability distribution to estimate the location of the wireless terminal.

DETAILED DESCRIPTION

Figure 1:
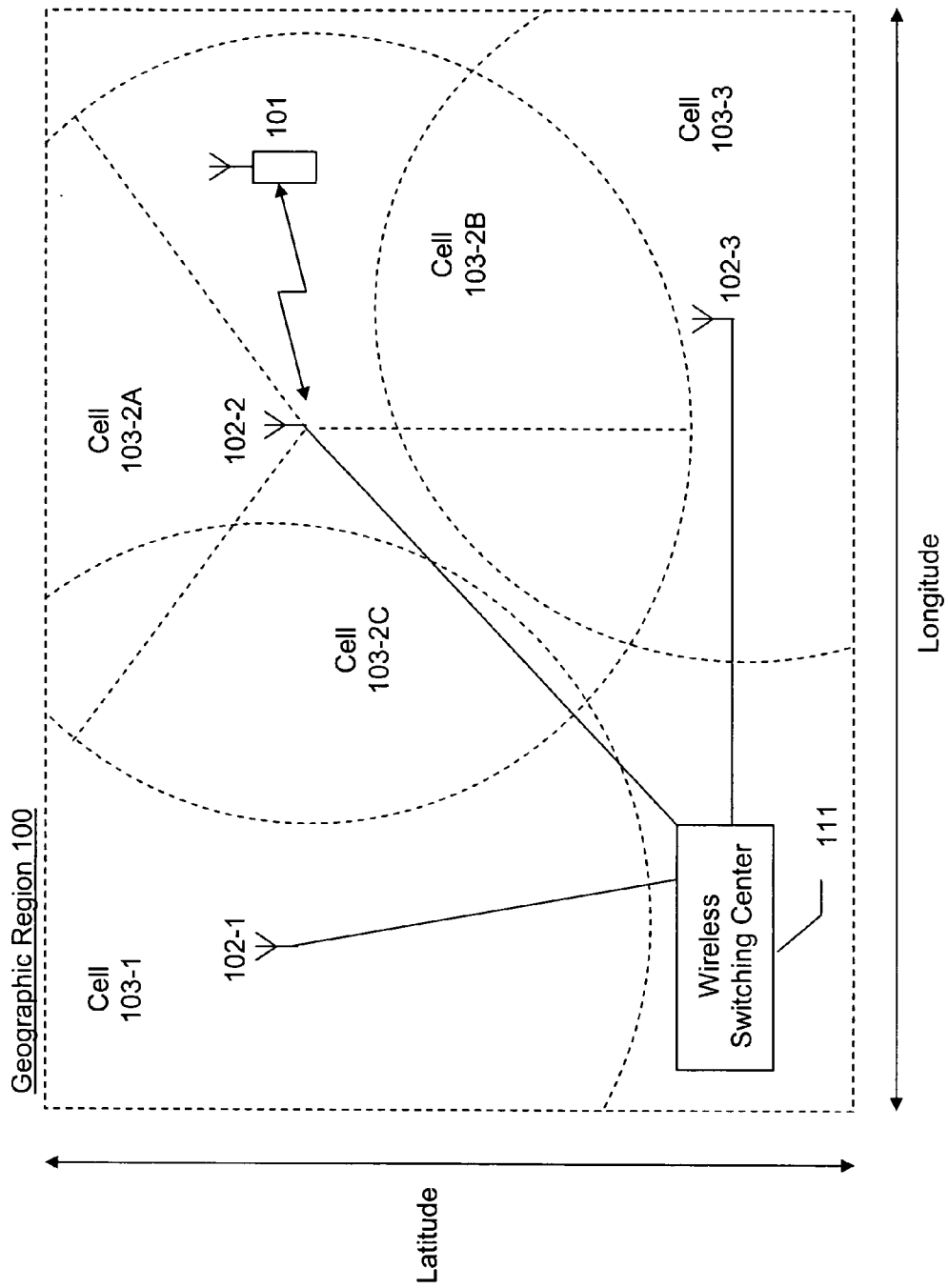
FIG. 1 depicts a map of a portion of a wireless telecommunications system.

FIG. 1 depicts the elements of a wireless telecommunications system that provides wireless telecommunications service to wireless terminals (e.g., wireless terminal 101, etc.) within geographic region 100. The hub of the telecommunications system is wireless switching center 111, which might also be known as a mobile switching center ("MSC") or a mobile telephone switching office ("MTSO").

Typically, wireless switching center 111 is connected to a plurality of base stations (e.g., base stations 102-1, 102-2, and 102-3), which are dispersed throughout the geographic area serviced by the system. Each base station has one or more cells (e.g., cells 103-1, 103-2A, 103-2B, 103-2C, and 103-3) each corresponding to a specific antenna and serving a specific portion of the geographic region 100. As shown in FIG. 1, a cell may be omni-directional (e.g., 103-1 and 103-3) or may be limited to a specific angular sector (e.g., 103-2A, 103-2B, and 103-2C). It is well known that operation of a wireless communications system requires some amount of overlap in the areas served by the various cells. Cells whose coverage regions overlap are separated in frequency in IS-136 and GSM networks and by pilot code in CDMA networks. In FIG. 1, cell 103-2B at base station 102-2 is serving wireless terminal 101.

As is well known to those skilled in the art, wireless switching center 111 is responsible for, among other things, establishing and maintaining calls between wireless terminals and between a wireless terminal and a wireline terminal (which is connected to the system via the local or long-distance networks, or both, and which are not shown in FIG. 1).

Figure 2:
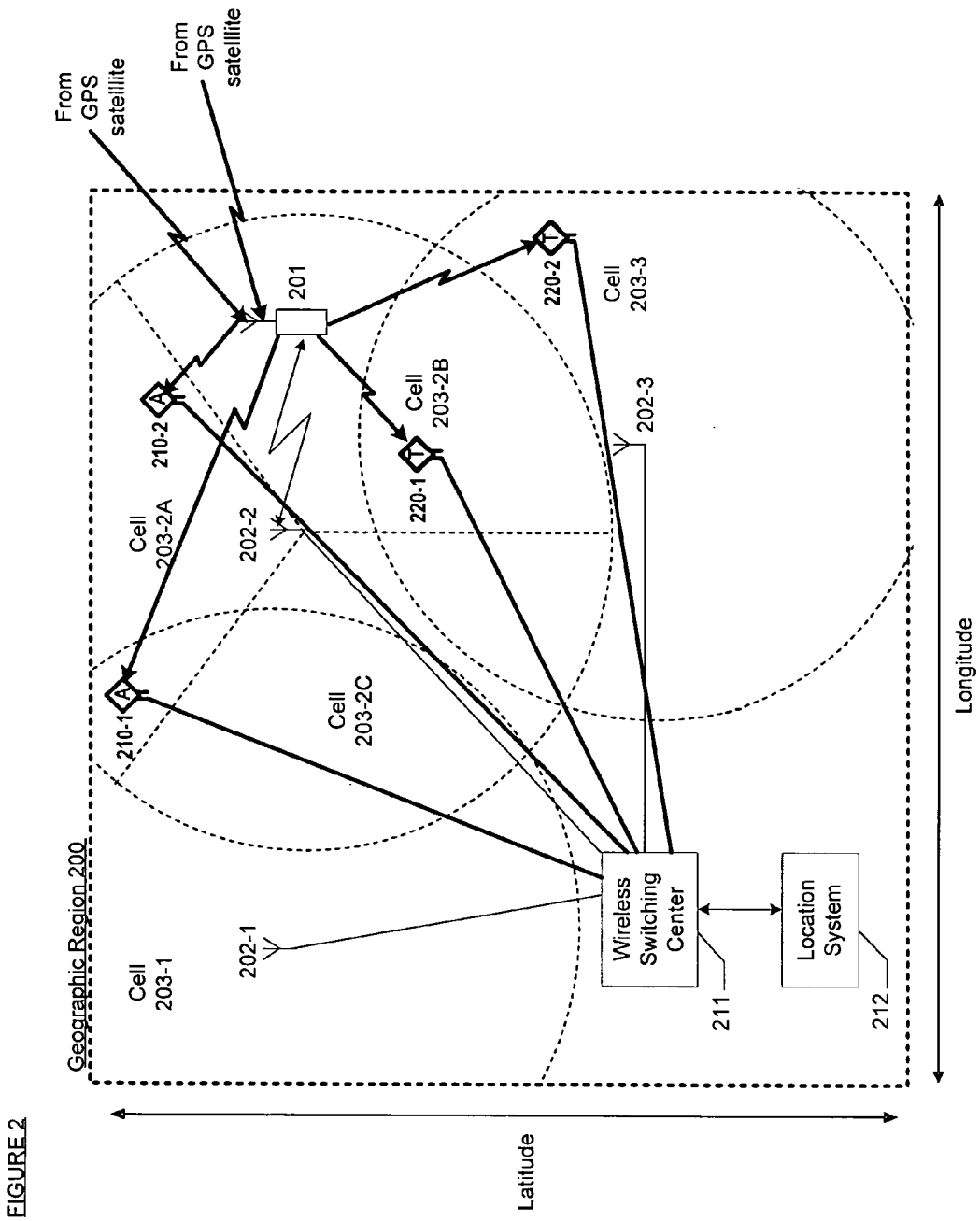
FIG. 2 depicts a map of the illustrative embodiment of the present invention.

Overview—FIG. 2 depicts a map of the illustrative embodiment of the present invention, which comprises: wireless switching center 211, location system 212, base stations 202-1, 202-2, and 202-3, angle-of-arrival sensors 210-1 and 210-2, time-of-arrival sensors 220-1 and 220-2, and wireless terminal 201, interconnected as shown.

The illustrative embodiment operates in accordance with the Global System for Mobile Communications (formerly known as the Groupe Speciale Mobile) protocol, which is ubiquitously known as "GSM." After reading this disclosure, however, it will be clear to those skilled in the art how to make and use embodiments of the present invention that operate in accordance with other protocols, such as the Universal Mobile Telephone System ("UMTS"), CDMA-2000, and IS-136 TDMA.

Wireless switching center 211 is a switching center as is well-known to those skilled in the art in most respects, but is different in that it is capable of communicating with location system 212 and geometry-of-arrival sensors 210 and 220 in the manner described below. After reading this disclosure, it will be clear to those skilled in the art how to create appropriate additional interfaces to wireless switching center 211.

Base stations 202-1, 202-2, and 202-3 are well-known to those skilled in the art and communicate with wireless switching center 211 through cables and other equipment (e.g., base station controllers, etc.) that are not shown in FIG. 2. As shown in FIG. 2, base station 202-1 is associated with omni-directional cell 203-1; base station 202-2 is associated with angular sector cells 203-2A, 203-2B, and 203-2C; base station 202-3 is associated with omni-directional cell 203-3; and wireless terminal 201 is serviced by cell 203-2B at base station 202-2. Although the illustrative embodiment comprises three base stations, it will be clear to those skilled in the art how to make and use embodiments of the present invention that use information from any number of base stations, each with one or more cells.

Angle-of-arrival sensors 210-1 and 210-2 receive a signal transmitted by wireless terminal 201, as is well-known in the art, and report the respective directions from which the signal was received to wireless switching center 211. Although in FIG. 2 angle-of-arrival sensors 210-1 and 210-2 are not collocated with base stations (e.g., sensor 210-1 mounted at base station 202-3 and sensor 210-2 mounted at base station 202-2, etc.), in some embodiments it might be advantageous to do so.

Time-of-arrival sensors 220-1 and 220-2 receive a signal transmitted by wireless terminal 201, as is well-known in the art, and report the respective times at which the signal was received to wireless switching center 211. Again, although in FIG. 2 time-of-arrival sensors 220-1 and 220-2 are not collocated with base stations (e.g., sensor 220-1 mounted at base station 202-1 and sensor 220-2 mounted at base station 202-2, etc.), in some embodiments it might be advantageous to do so.

Wireless terminal 201 is a standard GSM wireless terminal as is currently manufactured and used throughout the world. Wireless terminal 201, as directed by its serving cell 203-2B, measures and reports to wireless switching center 211 the signal strength of signals from various nearby cells (e.g., cells 203-1 and 203-3 at base stations 202-1 and 202-3, respectively, and non-serving cells 203-2A and 203-2C at base station 202-2) in well-known fashion.

As is well-known in the art, wireless terminal 201 transmits signals (e.g., voice signals directed to its serving cell 203-2B, etc.) via a wireless transmitter. In addition, wireless terminal 201 might be equipped with a Global Positioning System (GPS) receiver for receiving one or more satellite navigation signals, as is depicted in FIG. 2 and is also well-known in the art.

In accordance with the illustrative embodiment of the present invention, all of the specific portions of the radio frequency spectrum fall within the same band that wireless terminal 201 uses to communicate with cells at base stations 202-1, 202-2, and 202-3. In some alternative embodiments of the present invention, however, some or all of the specific portions of the radio frequency spectrum are outside the band that wireless terminal 201 uses to communicate with base stations 202-1, 202-2, and 202-3. In any case, it will be clear to those skilled in the art how to make and use wireless terminal 201.

Location system 212 is a computer system that is capable of estimating the location of wireless terminal 201, as described in detail below. Although the illustrative embodiment depicts location system 212 as estimating the location of only one wireless terminal, it will be clear to those skilled in the art that location system 212 is capable of estimating the location of any number of wireless terminals serviced by wireless switching center 211.

Furthermore, although location system 212 is depicted in FIG. 2 as a distinct entity from wireless switching center 211, this is done principally to highlight the distinction between the functions performed by wireless switching center 211 and the functions performed by location system 212. It will be clear to those skilled in the art how to make and use embodiments of the present invention in which location system 212 resides within or without wireless switching center 211.

Furthermore, although wireless switching center 211, location system 212, base stations 202-1, 202-2, and 202-3, angle-of-arrival sensors 210-1 and 210-2, and time of-arrival sensors 220-1 and 220-2 are depicted in FIG. 2 as being within geographic region 200 (i.e., the region of candidate locations for wireless terminal 201 ), this is not necessarily so, and it will be clear to those skilled in the art how to make and use embodiments of the present invention in which some or all of these elements are not within the region of location estimation.

Furthermore, although in the illustrative embodiment geometry-of-arrival measurements from sensors 210 and 220 are reported to wireless switching center 211 and subsequently sent to location system 212, it will be clear to those skilled in the art how to make and use embodiments of the present invention in which some or all of the geometry-of-arrival sensors report their measurements directly to location system 212.

Furthermore, although in the illustrative embodiment location system 212 reports the estimated location of wireless terminal 201 to wireless switching center 211, it will be clear to those skilled in the art how to make and use embodiments of the present invention in which location system 212 reports the estimated location of wireless terminal 201 directly to a third party consumer. In addition, it will be clear to those skilled in the art how to make and use embodiments of the present invention in which location system 212 receives a request for the location estimate directly from a third party provider of location-based services, rather than from wireless switching center 211.

Figure 3:
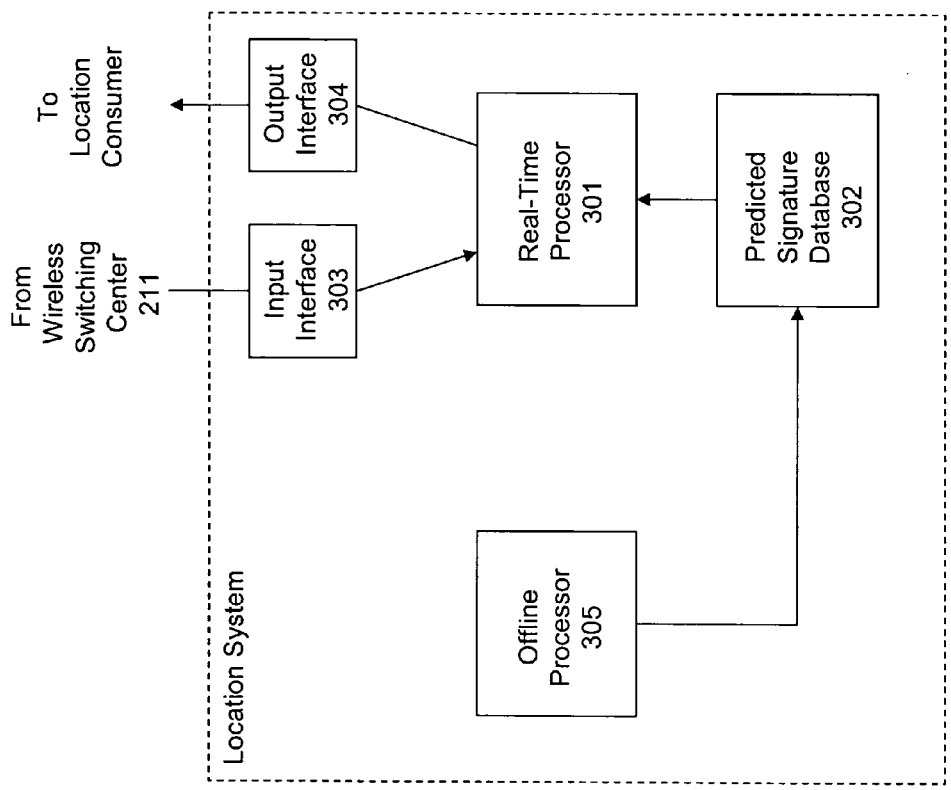
FIG. 3 depicts a block diagram of the salient components of location system 212.

FIG. 3 depicts a block diagram of the salient components of location system 212 in accordance with the illustrative embodiment. As shown in FIG. 3, location system 212 comprises: real-time processor 301, predicted signature database 302, input interface 303, output interface 304, and offline processor 305, which are interconnected as shown.

Input interface 303 receives information from wireless switching center 211, as disclosed below and with respect to FIG. 4, and forwards this information to processor 302. It will be clear to those skilled in the art that this interface function could be implemented as a part of the real-time processor 301.

Real-time processor 301 is a general-purpose processor as is well-known in the art that is capable of performing the operations described below and with respect to FIG. 4. Real-time processor 301 receives measurements from input interface 303 and sends the location estimate to output interface 304 in well-known fashion. It uses values from the predicted signature database 302 in its computation.

Predicted signature database 302 stores predicted signal strength values and predicted geometry-of-arrival values as described below and with respect to FIG. 4.

Output interface 304 receives location estimate from real-time processor 301 and transmits this output to the location consumer in well-known fashion. Depending on the application, the location consumer may be wireless switching center 211 or some other designated recipient. It will be clear to those skilled in the art that this interface function could be implemented as a part of the real-time processor 301.

Offline processor 305 performs all of calculations needed to create and maintain predicted signature database 302. Although it is shown in FIG. 3 as a separate computer from the real-time processor 301, it will be clear to those skilled at the art that these functions could be implemented on the same physical computer.

Figure 4:
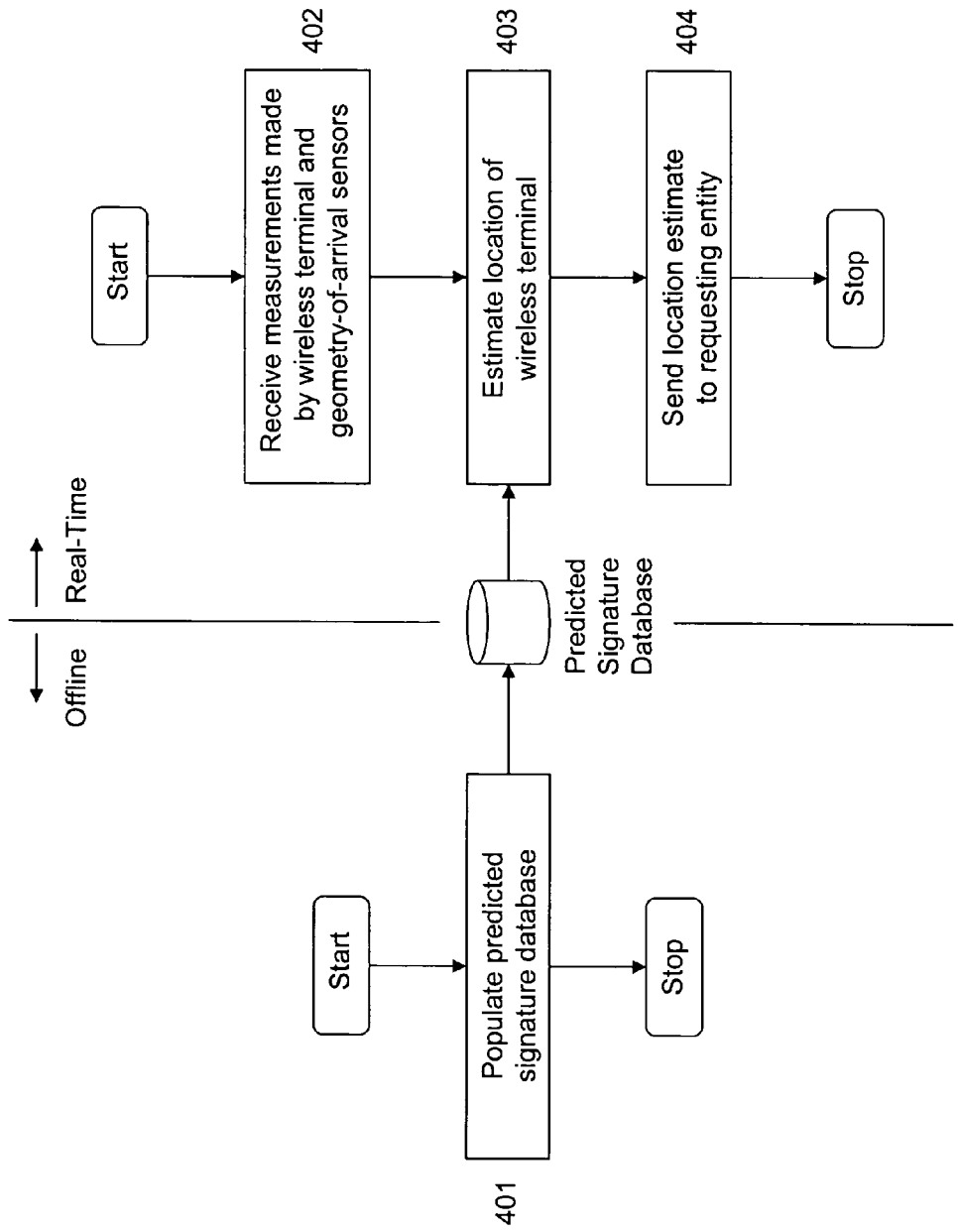
FIG. 4 depicts a broad overview of the salient operations performed by the illustrative embodiment in ascertaining the location of wireless terminal 201 in geographic region 200.

Location System—FIG. 4 depicts a broad overview of the salient operations performed by location system 211 in estimating the location of wireless terminal 201 in geographic region 200. In summary, the functions performed by the illustrative embodiment can be grouped for ease of understanding into four operations:

i. the population of predicted signature database 302;
ii. the receipt of signal strength and time-of-arrival measurements from wireless terminal 201; angle-of-arrival measurements from sensors 210-1 and 210-2; and time-of-arrival measurements from sensors 220-1 and 220-2.
iii. the estimation of the location of wireless terminal 201; and
iv. the delivery of the estimated location of wireless terminal 201 to the designated recipient.

Figure 5:
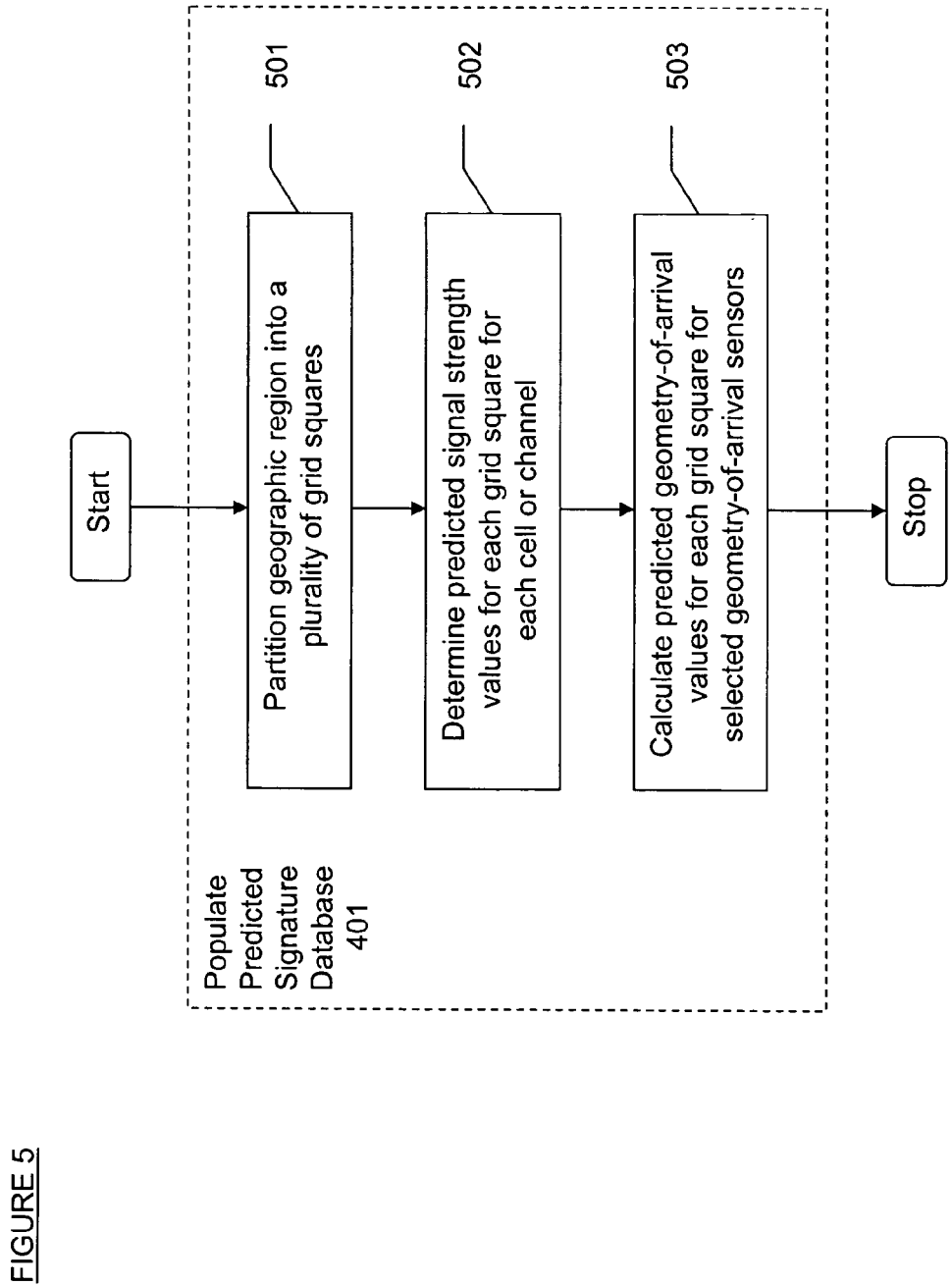
FIG. 5 depicts a flowchart of the tasks performed in Operation 401.

The details of each of these operations are described briefly below and in detail afterwards with respect to FIGS. 5 though 12. It should be noted, however, that the first operation is performed only occasionally (first when the location system 212 is initialized and later when changes in the configuration of the wireless network or changes in the physical environment cause changes in the signal environment), but the last three operations are performed each time the location of a wireless terminal 201 is requested.

At Operation 401, the database builder 302 associates a tuple of predicted signal strength values and predicted geometry-of-arrival values with each one of a specified set of locations within geographic region 200. The tuple includes one predicted signal strength value for each signal the wireless terminal 201 might be required to monitor in geographic region 200. The tuple also includes one geometry-of-arrival value for each of the geometry-of-arrival sensors selected for inclusion in the database for geographic region 200. Operation 401 is generally complex and potentially expensive, but because the signal environment exploited by this invention is relatively stable, this operation needs to be performed only occasionally. The details of Operation 401 and the criteria for determining which of the geometry-of-arrival sensors to include in predicted signature database 302 are described in detail below and with respect to FIG. 5.

At Operation 402, location system 212 receives all relevant measurements from the wireless switching center 211. In a system based on signal strength alone, the location system 212 receives (i) n signal strength measurements $R_1 \ldots R_n$ as made by wireless terminal 201, where n is a positive integer. In a system based on both signal strength and geometry-of-arrival, location system 212 also receives any combination of the following: (ii) m time-of-arrival measurements $G_1 \ldots G_m$ as received by wireless terminal 201, where m is a positive integer, (iii) k angle-of-arrival measurements $A_1 \ldots A_k$ as received, respectively, by sensors 210-1 through 210-k, where k is a positive integer (k=2 in FIG. 2), and (iv) r time-of-arrival measurements $T_1 \ldots T_r$ as received, respectively, by sensors 220-1 through 220-r, where r is a positive integer (r=2 in FIG. 2).

As is well known to those skilled in the art, the wireless terminal 201 periodically or sporadically provides measurements $R_1 \ldots R_n$ and $G_1 \ldots G_m$ to wireless switching center 211. In the illustrative embodiment, geometry-of-arrival sensors 210 and 220 also periodically or sporadically provide measurements $A_1 \ldots A_k$ and $T_1 \ldots T_r$, respectively, to the wireless switching center 211. Measurements received by wireless switching center 211 may be forwarded to location system 212 either as a complete set or one-by-one as received by the wireless switching center. Although all of the measurements to be used in the location estimate must be made during the time period of interest, it is not necessary that they all be made at the same times or at the same rates. The only requirement is that location system 212 knows the time at which each measurement was made.

At Operation 403, the location system 212 estimates the location of wireless terminal 201 based on received signal strength measurements, $R_1 \ldots R_n$, predicted signature database 302, time-of-arrival measurements $G_1 \ldots G_m$ (if available), angle-of-arrival measurements $A_1 \ldots A_k$ (if available), and time-of-arrival measurements $T_1 \ldots T_r$ (if available). The details of Operation 403 are described in detail below and with respect to FIG. 7.

At Operation 404, location system 212 transmits the location estimated in Operation 403 to the designated entity (not shown) for use in an application. (For the E911 application, for example, the designated entity is the Public Safety Answering Point [PSAP] specified for the serving cell of the wireless call.) It is well known in the art how to use the estimated location of a wireless terminal in an application.

At this point, Operations 401 and 403 are described in detail. Operations 402 and 404 (receiving the measurements and sending the location estimate, respectively) are straightforward, and no additional detail is required.

Operation 401: Populate Predicted Signature Database 302—FIG. 5 provides a flowchart of the tasks performed in Operation 401.

Task 501: At Task 501, geographic region 200 is partitioned into a plurality of tessellated grid squares. In the illustrative embodiment of the present invention, geographic region 200 is a rectangular area 650 meters by 850 meters. After reading this specification, it will be clear to those skilled in the art how to make and use embodiments of the present invention that operate with geographic regions of other sizes and shapes.

Figure 6:
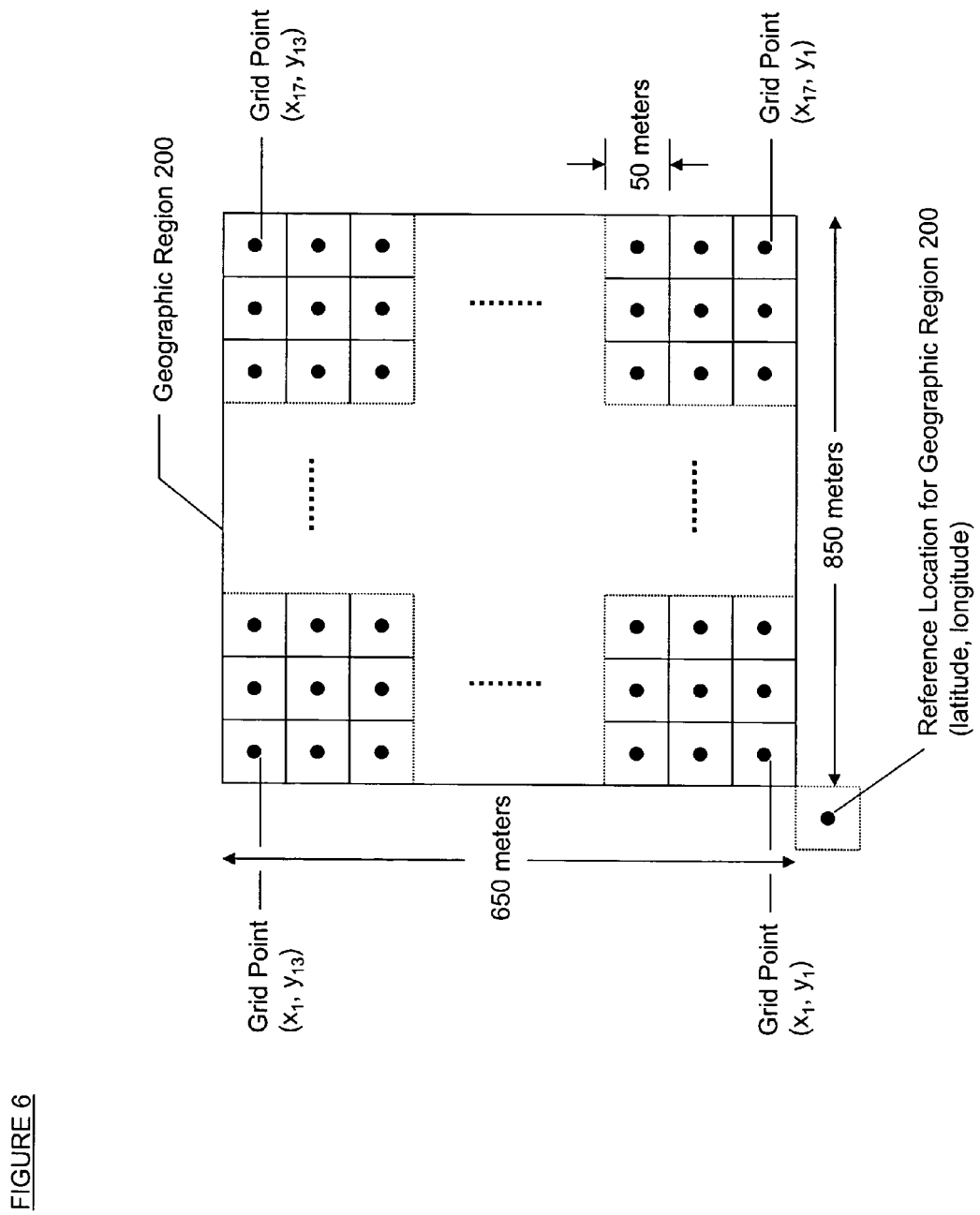
FIG. 6 depicts a map of how geographic region 200 is partitioned into 221 grid squares in accordance with the illustrative embodiment of the present invention.

As shown in FIG. 6, in the illustrative embodiment, geographic region 200 is partitioned into an array of 221 grid squares 50 meters on a side whose centers are grid points $(x_1,y_1)$ through $(x_{17},y_{13})$. The spatial resolution of the database 302 defines the highest resolution with which the illustrative embodiment can locate a wireless terminal. In other words, the illustrative embodiment can only estimate the location of a wireless terminal to within one grid square (i.e., 50 by 50 meters in the illustrative embodiment). If greater resolution is desired, for example 25 meters, then geographic region 200 would need to be partitioned into 25 meter grid squares. In this case, there would be 884 grid squares, which is considerably more than the 221 used in the illustrative embodiment. It will be clear to those skilled in the art that the region could be partitioned into a variety of other non-overlapping shapes (e.g., rectangles, hexagons, etc.).

While the number of grid squares into which geographic location 200 is partitioned is arbitrary, selection of an appropriate grid resolution is based on three factors. First, as the size of each grid square decreases, the resolution of the embodiment increases, and, all other things being equal, the accuracy of the location estimate increases. Second, as the size of each grid square decreases, the size of the database increases, and, consequently, the computation time for Operation 403 increases. Third, if the grid resolution is so fine that many neighboring grid squares have the same predicted signal strength values, Operation 403 will have to perform many unnecessary computations. It will be clear to those skilled in the art how to consider these three factors when deciding how to partition a geographic region.

Task 502: At Task 502, predicted signal strength values are determined for each grid point in geographic region 200 and stored in predicted signature database 302. In accordance with the illustrative embodiment, the signal used from each cell is the control channel because it is broadcast at a constant power. In some embodiments the signal strength portion of the database might be organized by cell, while in some other embodiments the signal strength portion of the database might be organized by control channel. It is well-known in the art how to calculate predicted signal strength per channel from predicted signal strength per cell.

In some embodiments, when the total number of cells is relatively small (such as in FIG. 2, where there are only five cells), each of the cells might be assigned a different control channel, in which case predicted signature database 302 is the same whether organized by cell or by channel. In a wireless system with a relatively large number of cells, however, the limited number of channels available to the wireless system might require control channel re-use (i.e., two or more cells are assigned to the same control channel.) As is well-known in the art, in a well-designed wireless system cells using the same control channel are located far enough apart so that they would not interfere with each other.

In a GSM network, the decision whether to organize predicted signature database 302 by channel or by cell is primarily an issue of database size, since a GSM wireless terminal 201 only reports signals when it can decode the BSIC (Base Station Identity Code). Within a limited area, the combination of the channel and the BSIC allow the location system to determine the unique cell whose control channel signal strength has been reported.

In contrast, in an IS-136 network the decision whether to organize predicted signature database 302 by channel or by cell is also a computational issue, because an IS-136 wireless terminal reports the control channel signal strength without attempting to decode the DVCC (Digital Verification Color Code). Thus, if predicted signature database 302 stores predicted signal strength for an IS-136 network on a cell-by-cell basis, then location system 212 must calculate per-channel predicted signal strengths as part of Operation 403.

Because there are five cells in the illustrative embodiment, each with a different control channel, a tuple of five predicted signal strength values must be specified for each grid point. In accordance with the illustrative embodiment, the tuple of five signal strength measurements for each grid point are determined through a combination of:

(i) a theoretical radio-frequency propagation model, and
(ii) empirical signal strength calibration measurements.

It will be clear to those skilled in the art how to accomplish this.

When the signal strength tuples for each location in geographic region 200 have been determined, they are stored in predicted signature database 302 in a data structure that associates each location with the tuple for that location. The data structure is then stored in predicted signature database 302.

Task 503: In Task 503, predicted measurement values for a selected portion of the geometry-of-arrival sensors are calculated and stored in predicted signature database 302. For measurements that vary significantly over time, storing predicted values in the database is not practical. For example, the time required for a signal to travel from a GPS satellite to wireless terminal 201 depends on the location of the satellite, which is constantly changing as the satellite moves in its orbit. For geometry-of-arrival measurements involving stationary sensors, the decision to include the predicted measurements in the database or calculate them in real-time in Operation 403 is a tradeoff between storage and real-time computational load.

As in the case of predicted signal strength values, a tuple of predicted geometry-of-arrival measurement values is calculated and stored in predicted signature database 302 for each grid square in geographic region 200. As is well-known in the art, the augmented signal measurement database might associate additional information with each location, such as an identifier, coordinates (e.g., latitude/longitude, etc.), altitude, etc. In the illustrative embodiment, the calculations for determining the predicted measurement values are performed in Operation 403, described below, while in some other embodiments, these calculations might instead be performed in Operation 401 above.

Database Structure: In some embodiments, predicted signature database 302 might be a relational database that stores the contents of this data structure in one or more tables, as is well-known in the art. In some other embodiments, database 302 might be another kind of database (e.g., object-oriented database, hierarchical database, etc.); it will be clear to those skilled in the art how to store the contents of the data structure in such databases. In still some other embodiments, database 302 might store the predicted measurement values in multi-dimensional arrays corresponding directly to the signal strength and geometry-of-arrival maps of geographic region 200. As is well-known in the art, predicted signature database 302 might associate additional information with each location, such as an identifier, coordinates (e.g., latitude/longitude, etc.), altitude, etc.

Figure 7:
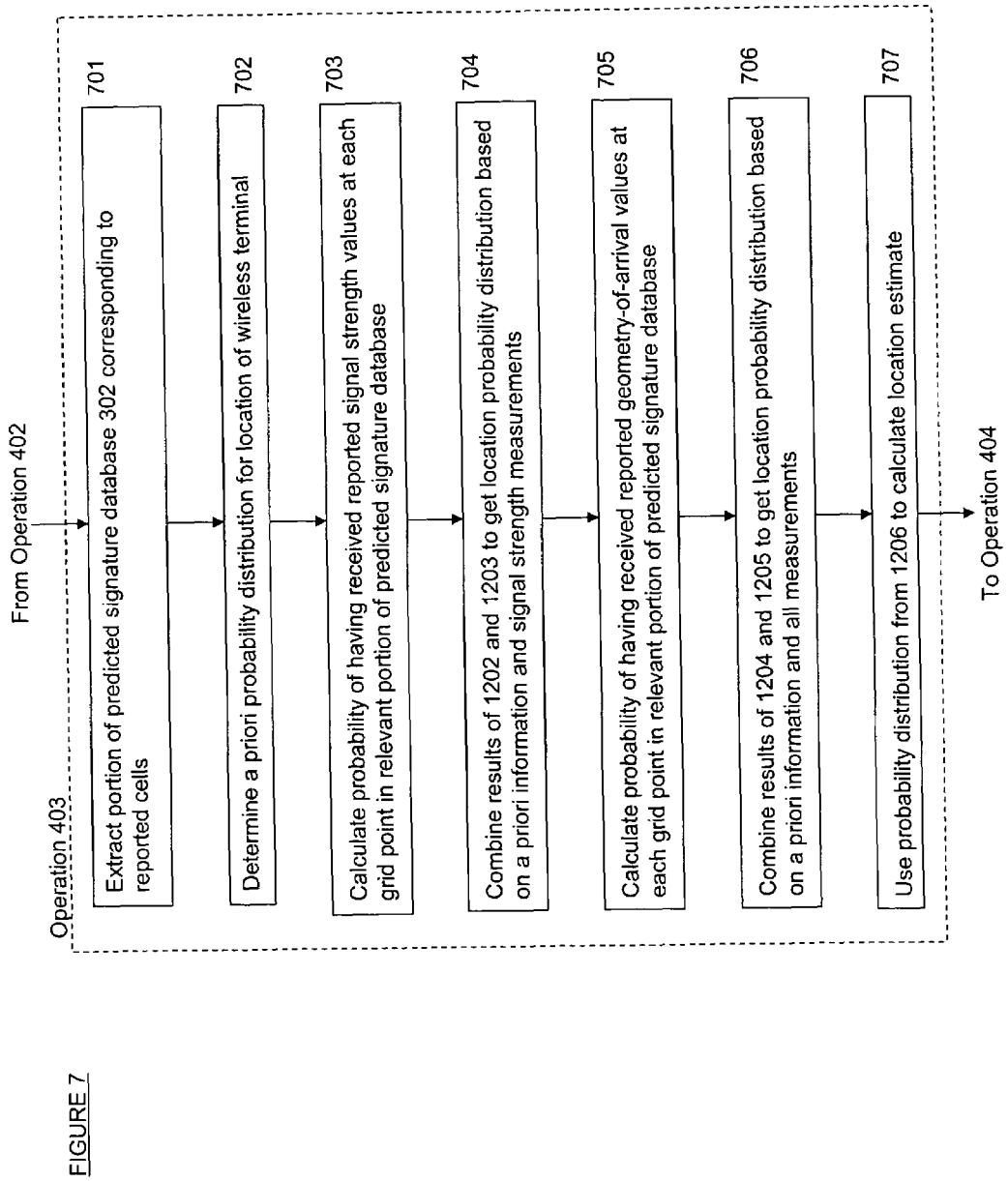
FIG. 7 depicts a flowchart of the tasks performed in Operation 403.

Operation 403: Estimate Location of Wireless Terminal 201—FIG. 7 depicts a flowchart of Operation 403. Note that Tasks 701-704 and 707 are the operations required when the location estimate is based only on signal strength measurements (i.e., the baseline location system). Tasks 705 and 706 must be added when supplementary geometry-of-arrival measurements are also available. Although it is not necessary that the signals strength measurements and the geometry-of-arrival measurements be made at exactly the same time, the illustrative embodiment assumes that they are. From U.S. Pat. No. 6,393,294, it will be obvious to anyone practiced in the art how to extend this description to the case where the measurements are not made at the same time.

Figure 8:
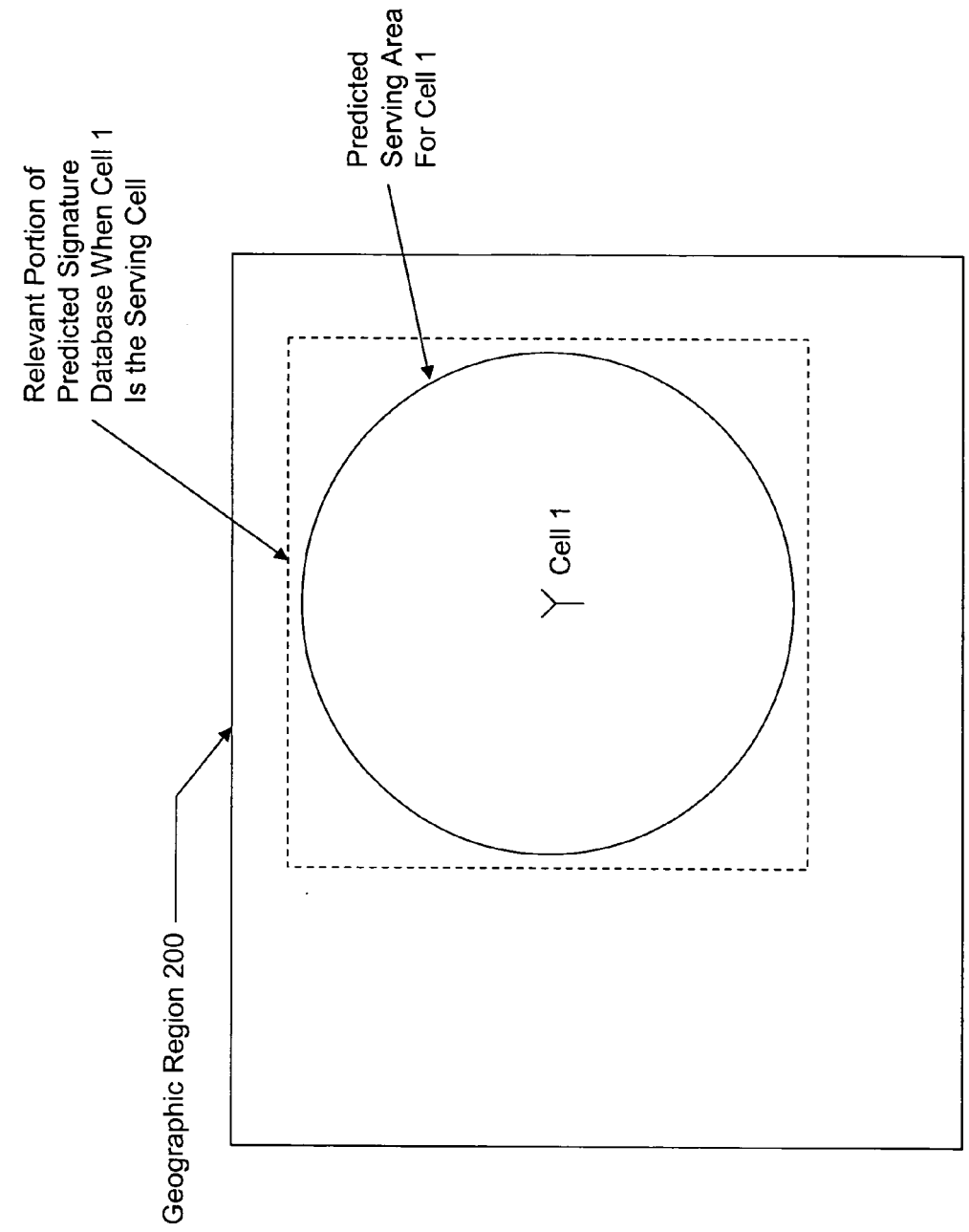
FIG. 8 illustrates the selection of the subset of grid locations of the geographic region that are relevant to a specific serving cell.

Task 701: At Task 701, the relevant portion of the predicted signature database 302 is retrieved. For example, if the geographic area 200 covered by the database were 20 kilometers on a side, the area where the reported serving cell could possibly act as a serving cell would be much smaller than the entire geographic area covered by the database. Restricting the subsequent computations to a smaller area containing all the viable candidates for the location of the wireless terminal 201 significantly reduces the amount of computation needed to estimate that location. This concept is illustrated in FIG. 8.

Task 702: At Task 702, the location system 212 determines the a priori location probability distribution (i.e., the probability distribution before any of the actual measurement values are considered). The simplest approach would be to assume that all of the grid points in the area extracted in Task 701 are equally likely, so that the a priori probability of each grid point's being the actual location would be 1/(number of grid points in relevant area). However, other approaches might also be used. For example, if one part of the relevant area were densely populated and the other part were not, it might be appropriate to assign the grid points in the heavily populated portion a higher a priori probability than those in the unpopulated portion. Another approach would be to use the historical pattern of previous location requests to create the a priori probability distribution.

Figure 9:
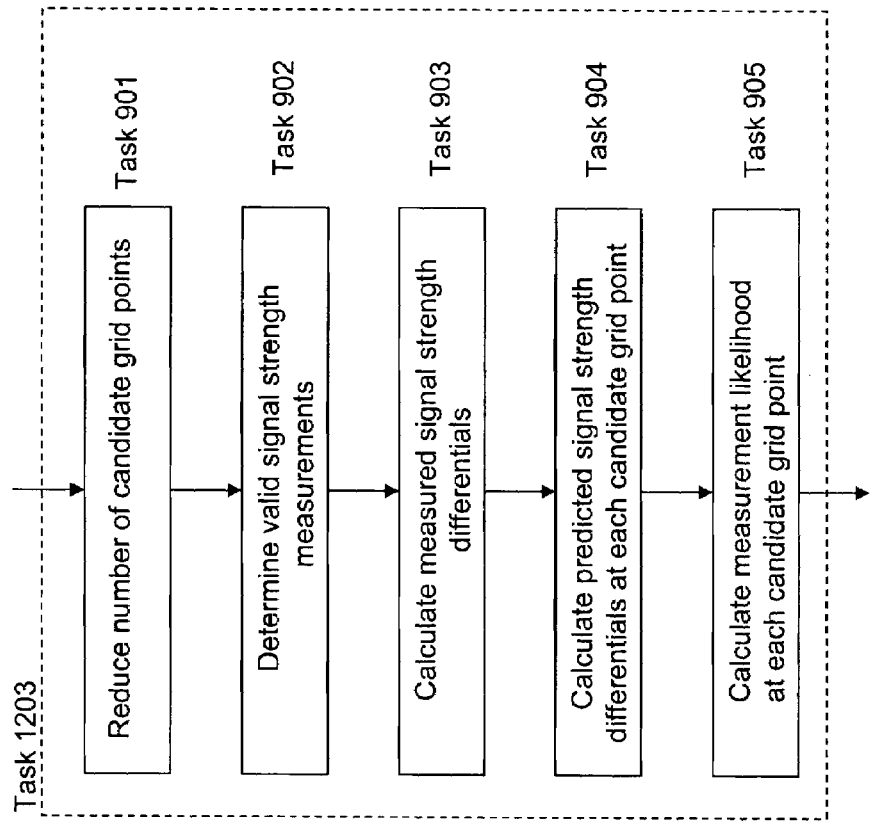
FIG. 9 depicts a flowchart of the steps performed in Task 703.

Task 703: At Task 703, the location system 212 calculates the measurement likelihood for the reported signal strength measurements at each point in the relevant area (i.e., the probability that the reported measurements would have been received if the wireless terminal 201 really were in that grid square). This process is described in more detail below and with respect to FIG. 9.

Figure 10:
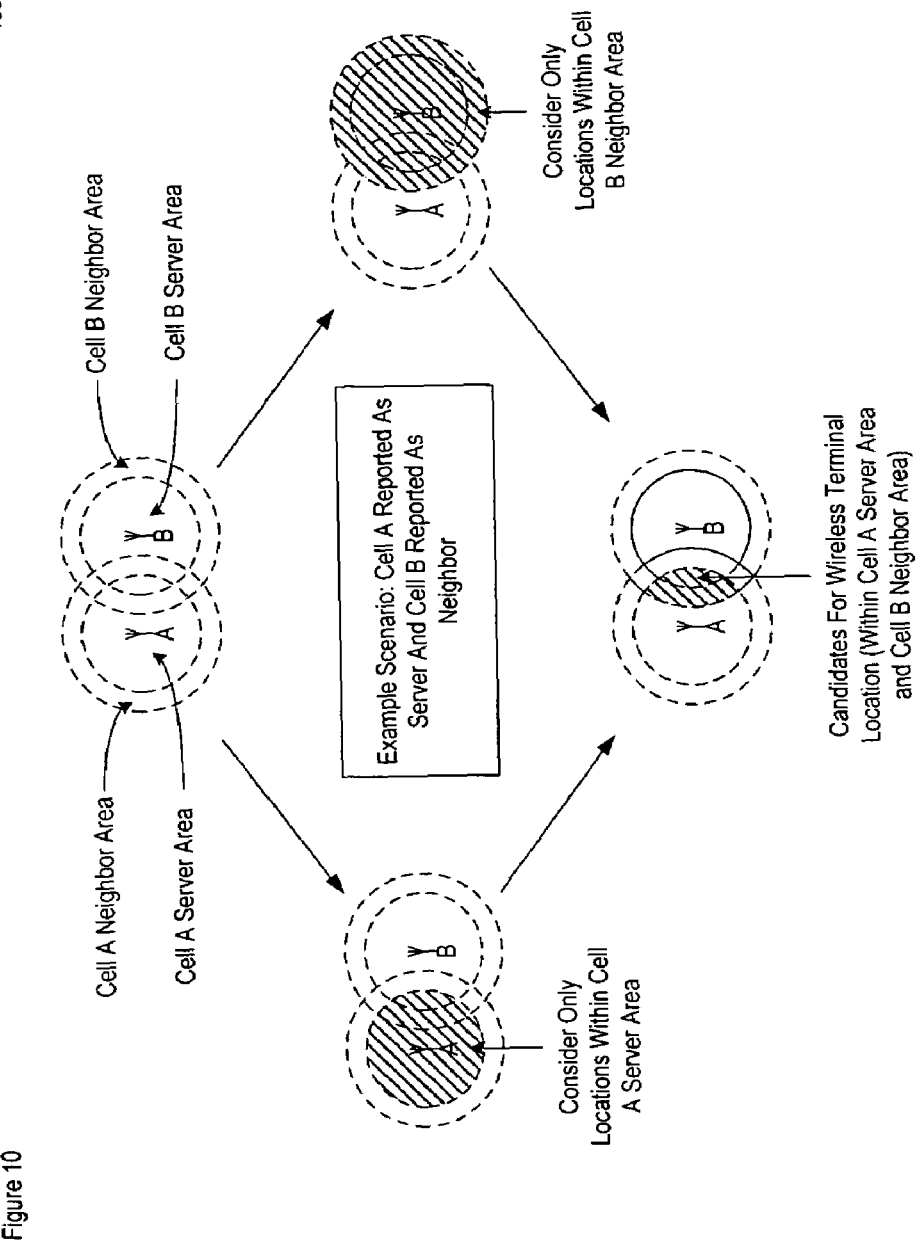
FIG. 10 illustrates the use of serving areas and neighbor areas in reducing the number of candidate grid points.

Step 901: In Step 901, the location system 212 uses a variety of information to reduce the number of grid points for which the subsequent calculations must be performed and to modify the final measurement likelihood that will be calculated for others. The various factors used in this search area reduction procedure are described below:

Serving Cell Area: Based on its predicted signal strength and those of nearby cells, each cell has an area where it might be able to act as the serving cell for a wireless call. An illustrative example of such areas is shown in FIG. 10. This area is obviously much larger than the so-called "best server area", since for a variety of reasons (including network load balancing, system hysteresis, etc.), a cell often acts as a serving cell when it is not the strongest signal at that location. Only points where the reported serving cell could act as a serving cell are considered as candidates for further computation.

Neighbor Cell Area: The illustrative example of FIG. 10 depicts exemplary neighbor areas in addition to serving cell areas. In GSM, the wireless terminal 201 is given a list of channels to monitor by the serving cell, and it only reports the signal strength for one or more of these channels when it is able to decode the BSIC (Base Station Identity Code) on that channel. Only grid points where the signal-to-interference ratio is such that the BSIC for a reported neighbor could reasonably be expected to be decoded are considered as candidates for further computation. In older protocols, such as IS-136, the wireless terminal 201 is not required to decode the signal in order to report a signal strength value. In these cases, this test is not applicable.

Timing Advance: In time-division multiplexed systems such as GSM or IS-136, the serving cell instructs the wireless terminal 201 to advance its responses by a certain amount so that its uplink signal will arrive back at the base station at approximately the same time it would if the wireless terminal were located at zero range from the base station. This insures that the uplink signal arrives at the base station in the correct time-slot. The timing advance that the wireless terminal is instructed to use gives an indication of the distance of the terminal from the serving cell. However, the quantization of the timing advance values in current wireless systems make this only a rough indication of distance. Nonetheless, the timing advance can also be used to eliminate candidate grid points for which the reported timing advance is very unlikely.

Un-Reported Neighbors: In GSM, if the wireless terminal 201 is able to decode the BSIC for more than 6 of the channels it has been instructed to monitor, it reports only the 6 strongest of these (subject to some additional requirements in dual-band systems). Thus, a grid point where the predicted signal strength of a neighbor that was not reported is significantly higher than those of the neighbors that were reported may be eliminated from further consideration.

Maximum Signal Strength: To eliminate the effects of unknown signal strength bias between the predicted signal strength database and the wireless terminal 201, the location estimate is based on relative signal strength. Nevertheless, in some cases, the absolute signal strength can be used to reduce the number of candidate grid points. The location system 212 can reasonably eliminate from consideration grid points where the predicted signal strength is significantly higher or significantly lower than the reported signal strength on a channel, where this test must include a margin for model errors, measurements errors, systematic biases, and the possibility of local signal fading. When a time series of measurements is available, the maximum and minimum signal strength reported over the entire time interval can be used to reduce the sensitivity of this test to local fading.

It will be clear to those skilled in the art how to determine and use factors for measurement errors and systematic bias in the tests described above.

Step 902: At Step 902, the location system 212 determines which of the signal strength measurements reported by the wireless terminal 201 are valid for use in calculating the measurement likelihoods. Because the wireless terminal reports the signal strengths to the switching center in a fixed length binary word (6 bits for GSM and 5 bits for IS-136), a fixed number of signal strength values may be reported (64 values for GSM and 32 values for IS-136). As a result, when the wireless terminal 201 reports the highest reportable value (−47 dBm for GSM and −51 dBm for IS-136), it really means that value or higher, and when it reports the lowest reportable value (−110 dBm for GSM and −113 dBm for IS-136), it really means that value or lower. In either case, using these saturated values to calculate the measurement likelihoods could lead to significant errors. For example, if a GSM wireless terminal were at a location where the signal strength for a particular channel was −37 dBm, it would still report at most a value of −47 dBm, and forcing the location algorithm to choose instead a location where the predicted signal strength was −47 dBm could lead to a substantial location error. Thus, measurements that are at either the minimum or maximum allowable signal strength are eliminated from the measurement likelihood calculation at this task.

Step 903: At Step 903, the location system 212 computes the signal strength differentials for those reported channels whose signal strength measurements are not at the reporting limits. In particular, for n reported signals, $S_1, S_2, \ldots, S_n$, that are not at the maximum or minimum reportable signal strength, n-1 signal strength differentials are computed where:

$$\Delta S_k = S_k - S_1$$

for k=2, 3, . . . n, wherein $\Delta S_k$ is the $k^{th}$ signal strength differential, $S_k$ is the reported signal strength of Signal k, and $S_1$ is the reported signal strength of Signal 1. This illustrative embodiment computes the signal strength differentials as the difference between Signal 2, Signal 3, . . . , Signal n and Signal 1. It will be apparent to anyone skilled in the art that any arrangement that results in n-1 independent differential pairs is informationally equivalent. For example, the same location estimate would result from an embodiment that used $S_1-S_2$, $S_2-S_3$, $S_3-S_4$, etc.

Step 904: At Step 904, location system 212 computes the predicted signal strength differentials for only those locations that were not eliminated from consideration in Step 902. In particular, for the n reported signals that are not at the maximum or minimum reportable signal strength, n-1 predicted signal strength differentials are computed where:

$$\Delta R_k(x,y) = R_k(x,y) - R_1(x, y)$$

for k=2, 3, . . . n, where $\Delta R_k(x,y)$ is the $k_{th}$ predicted signal strength differential for location (x,y), $R_k(x,y)$ is the predicted signal strength of Signal k at location (x,y) in predicted signature database 302, and $R_1(x,y)$ is the reported predicted signal strength of Signal 1 at location (x,y) in predicted signature database 302. Obviously, the differencing scheme used in Step 904 must be consistent with that adopted for Step 903.

Step 905: At Step 905, the signal differentials calculated in Step 903 and the predicted signal differentials calculated in Step 904 are combined to give the measurement likelihood at each of the candidate grid points (i.e., the probability that the reported signals would have been measured if the wireless terminal really had been at that grid point). The first step is to generate the error differentials at each candidate grid point according to:

$$\Delta e(x, y) = \begin{bmatrix} \Delta e_2(x, y) \\ \Delta e_3(x, y) \\ \vdots \\ \Delta e_n(x, y) \end{bmatrix} = \begin{bmatrix} \Delta S_2 - \Delta R_2(x, y) \\ \Delta S_3 - \Delta R_3(x, y) \\ \vdots \\ \Delta S_n - \Delta R_n(x, y) \end{bmatrix}$$

Although it is reasonable to assume that the errors in each component of the measurement are independent, those of the measurement differentials are not. For example $S_2-S_1$ and $S_3-S_1$ both involve $S_1$ and, therefore, cannot be said to be statistically independent. For the differencing scheme used in the illustrative embodiment, the error covariance associated with the error differential is:

$$M = \begin{bmatrix} -1 & 1 & 0 & 0 & \cdots & 0 \\ -1 & 0 & 1 & 0 & \cdots & 0 \\ -1 & 0 & 0 & 1 & & 0 \\ \vdots & \vdots & \vdots & & \ddots & \\ -1 & 0 & 0 & 0 & & 1 \end{bmatrix} \begin{bmatrix} \sigma^2 & 0 & 0 & 0 & \cdots & 0 \\ 0 & \sigma^2 & 0 & 0 & \cdots & 0 \\ 0 & 0 & \sigma^2 & 0 & \cdots & 0 \\ 0 & 0 & 0 & \sigma^2 & & 0 \\ \vdots & \vdots & \vdots & & \ddots & \\ 0 & 0 & 0 & 0 & & \sigma^2 \end{bmatrix}$$

$$\begin{bmatrix} -1 & -1 & -1 & \cdots & -1 \\ 1 & 0 & 0 & \cdots & 0 \\ 0 & 1 & 0 & \cdots & 0 \\ 0 & 0 & 1 & & 0 \\ \vdots & \vdots & & \ddots & \\ 0 & 0 & 0 & & 1 \end{bmatrix}$$

$$M = \begin{bmatrix} 2 & 1 & 1 & \cdots & 1 \\ 1 & 2 & 1 & \cdots & 1 \\ 1 & 1 & 2 & \ddots & \vdots \\ \vdots & \vdots & \ddots & \ddots & 1 \\ 1 & 1 & \cdots & 1 & 2 \end{bmatrix} \sigma^2$$

where σ is the measurement error standard deviation.

In the illustrative embodiment the error statistics are the same for all of the measurements; in some other embodiments, however, the error statistics might not be the same in each component. It will be clear to those skilled in the art, after reading this specification, how to extend the illustrative embodiment accordingly for unequal error statistics.

Since the signal strength variations are well-known to be log normal, the measurement likelihood at grid point (x, y) is given by:

$$L(x, y) = e^{-\frac{1}{2}\Delta e(x,y)^T M^{-1} \Delta e(x,y)}$$

Note that because the differencing operation has made the components of the differential error vector statistically dependent, the "fit" of the measured to predicted signal strengths at each candidate grid point cannot be separated into "goodness of fit" terms that depend on a single component of the error differential vector.

Task 704: At Task 704 the location system 212 combines the a priori location probability distribution from Task 702 and the measurement likelihoods from Task 703 to obtain the location probability distribution based on a priori information and signal strength information. This calculation is performed by multiplying the a priori probability by the measurement likelihood at each grid point in the relevant area and then dividing this value by the sum of these values over all of the grid points in the relevant area.

$$P_{LOCATION\text{-}SIGNAL\ STRENGTH}(x, y) = \frac{L_{SIGNAL\ STRENGTH}(x, y) P_{LOCATION\text{-}A\ PRIORI}(x, y)}{\sum_{(x,y)} L_{SIGNAL\ STRENGTH}(x, y) P_{LOCATION\text{-}A\ PRIORI}(x, y)}$$

This normalization insures that the result is still a probability distribution (i.e., the sum of all of the location probabilities equals one).

Task 705: At Task 705, the location system 212 calculates the measurement likelihoods for the geometry-of-arrival measurements at each point in the relevant area. These calculations are summarized below.

Time-of-Arrival Measurements: In general, time-of-arrival measurements are of the form:

$$t_R = t_T + \frac{\sqrt{(x_T - x_R)^2 + (y_T - y_R)^2 + (z_T - z_R)^2}}{c} + \Delta t_{clock}$$

where $t_R$ is the time the signal was received according to the receiver clock, $t_T$ is the time the signal was sent according to the transmitter clock, the square root is the distance from the transmitter to the receiver, c is the speed of light, and $\Delta t_{clock}$ is the error between the transmitter and receiver clocks. Obviously, if the clocks were perfectly synchronized and the time-of-arrival were measured perfectly, this equation would define a sphere centered at the transmitter. The intersection of this sphere with the surface of the earth would define a line of possible locations in the geographic area 302. However, errors in clock synchronization of time-of-arrival measurements will transform this line into a band of possible locations. Typically, the clock error is a much more serious problem than the measurement errors.

If the predicted measurement values for a particular time-of-arrival sensor were pre-computed and stored in the predicted signature database 302, the quantity actually stored would be $t_R - t_r$ under the assumption that $\Delta t_{clock} = 0$.

If the time-of-arrival of a signal from the wireless terminal 201 is measured by two different receivers whose clocks are synchronized, subtracting one measurement from the other will eliminate the clock error at the expense of introducing a second time-of-arrival measurement error. Similarly if the wireless terminal 201 measures the time-of-arrival of two signals from two different receivers whose clocks are synchronized, and one measurement is subtracted from the other, the clock error is again eliminated at the expense of introducing a second measurement error. This latter case is the principle behind the GPS system.

Figure 11:
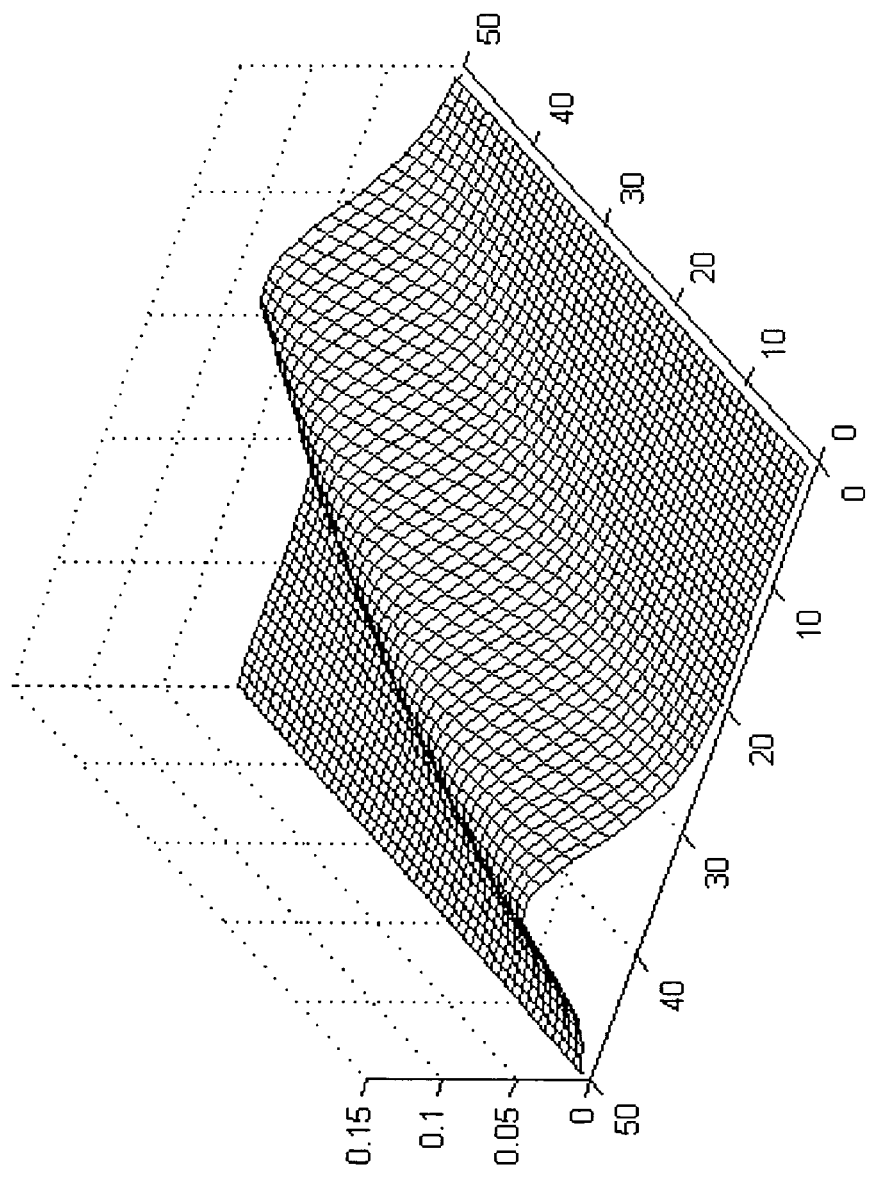
FIG. 11 illustrates the measurement likelihood function resulting from a pair of time-of-arrival sensors in the illustrative embodiment.

The time-difference-of-arrival created by either of these cases creates a different, but well-defined, band of candidate locations in the relevant area from Task 701. If we account for the statistical properties of the time-of-arrival measurement errors, then the likelihood associated with the candidate points will be different in the center of the band than at the edge of the band. For example, if the measurement error were modeled as a zero mean gaussian random variable, the measurement likelihood at any grid point x=(x, y, z) would be:

$$L(\underline{x}) = \exp\left\{-\frac{(t_{R_1} - t_{R_2} - h_1(\underline{x}) + h_2(\underline{x}))^2}{4\sigma^2}\right\}$$

where the time required for the signal to travel from the transmitter to receiver k is given by:

$$h_k(\underline{x}) = \frac{\sqrt{(x_{T_k} - x)^2 + (y_{T_k} - y)^2 + (z_{T_k} - z)^2}}{c}$$

and σ is the standard deviation of the time-of-arrival measurement error. This expression ignores the normalization factor for the gaussian distribution since it is the same at every point. With this expression, the measurement likelihood would be highest at the center of the band and would fall off gradually for points further and further from the center of the band. Each independent pair of such time-of-arrival measurements will thus create a measurement likelihood value at each grid point in the relevant area. An example of the measurement likelihood for the difference of two time-of-arrival measurements is shown in FIG. 11.

Angle-of-Arrival Measurements: Similarly, a perfect ground-based angle-of-arrival measurement would define a line at that angle from the sensor across the relevant area. Under the assumption that the wireless terminal 201 and the angle-of-arrival sensor 210 are at the same altitude (so that $z_T = z_R$), the angle-of-arrival of a signal from the wireless terminal is given by:

$$\alpha = \tan^{-1}\{(y_T - y_R)/(x_T - x_R)\}$$

where $(x_T, y_T, z_T)$ is the location of the wireless terminal and $(x_R, y_R, z_R)$ is the location of the sensor (receiver).

A simple model of angle measurement error would create a wedge, and a more sophisticated model (e.g., gaussian) would create a likelihood function that is highest along the line defined by the measured values and falls of gradually with angular distance from that line. Under the latter assumption, the measurement likelihood for a single angle-of-arrival measurement at grid point x=(x,y) is given by:

$$L(\underline{x}) = \exp\left\{-\frac{(\alpha - g(\underline{x}))^2}{2\sigma_A^2}\right\}$$

where the predicted angle-of-arrival value at the grid point is:

$$g(\underline{x}) = \tan^{-1}\{(y - y_R)/(x - x_R)\}$$

Figure 12:
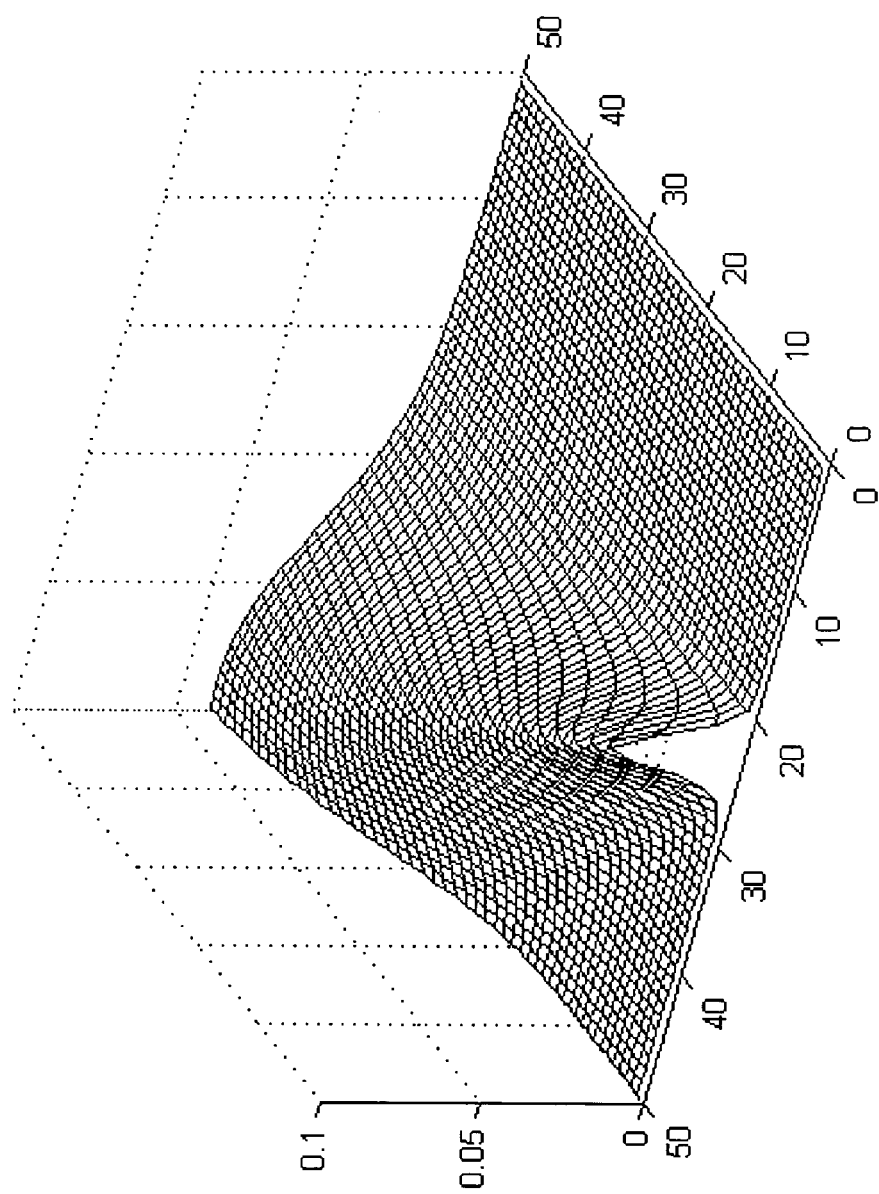
FIG. 12 illustrates the measurement likelihood function resulting from an angle-of-arrival sensor in the illustrative embodiment.

Each independent angle-of-arrival measurement will thus create a measurement likelihood value at each grid point in the relevant area. An example of the measurement likelihood for an angle-of-arrival measurement is shown in FIG. 12.

If the predicted measurement values for a particular angle-of-arrival sensor were pre-computed and stored in the predicted signature database 302, the quantity stored would be g(x).

Geometry-of-Arrival Measurement Likelihood: The total measurement likelihood at each grid point in the relevant area is simply the product of the measurement likelihoods calculated for all of the independent angle-of-arrival measurements and independent pairs of time-of-arrival measurements:

$$L_{GEOMETRY\text{-}OF\text{-}ARRIVAL}(\underline{x}) = \left\{\prod_{k=1}^{n} L_{ANGLE\text{-}OF\text{-}ARRIVAL_k}(\underline{x})\right\} \times \left\{\prod_{j=1}^{n} L_{TIME\text{-}DIFFERENCE\text{-}OF\text{-}ARRIVAL_j}(\underline{x})\right\}$$

The likelihood function for dependent pairs of time-of-arrival measurements must be calculated jointly in exactly the same fashion that the likelihood function for dependent pairs of signal strength measurements was calculated in Task 703.

Task 706: At Task 706, location system 212 combines the location probability distribution based on a priori information and signal strength measurements from Task 704 and the geometry-of-arrival measurement likelihoods from Task 705 to obtain the location probability distribution based on a priori information and all of the measurements. As in Task 704, this calculation is performed by multiplying the previously calculated location probability by the measurement likelihood at each grid point in the relevant area and then dividing this value by the sum of these values over all of the grid points in the relevant area.

$$p_{LOCATION}(x, y) = \frac{L_{GEOMETRY\text{-}OF\text{-}ARRIVAL}(x, y) p_{LOCATION\text{-}SIGNALSTRENGTH}(x, y)}{\sum_{(x,y)} L_{GEOMETRY\text{-}OF\text{-}ARRIVAL}(x, y) p_{LOCATION\text{-}SIGNALSTRENGTH}(x, y)}$$

Task 707: At Task 707, location system 212 estimates the location of wireless terminal 201 based on the location probability distribution generated in Task 706. At each grid point in the geographic region 200, the value of the probability distribution represents the probability that the wireless terminal 201 is within the grid square associated with that grid point. In accordance with the illustrative embodiment, location system 212 estimates the location of wireless terminal 201 based on the mean of the probability distribution. After reading this specification, however, it will be clear to those skilled in the art how to make and use embodiments of the present invention that estimate the location of wireless terminal 201 based on a different function of the probability distribution, such as the maximum likelihood function.

Any of these calculations provides an estimate of the location of the wireless terminal 201 relative to the origin of the local Cartesian coordinate system (i.e., relative to the reference location shown in FIG. 6). With the latitude and longitude of this reference location, it is straightforward to transform the location estimate from the local Cartesian coordinate frame to latitude and longitude. It should be noted that the calculations performed in this task are independent of the number and type of measurements that were used to form the location probability distribution. From Task 707, control passes to operation 404 in FIG. 4.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. A method comprising:
receiving
    (i) a first signal measurement for a first signal as received by a wireless terminal, and
    (ii) a second signal measurement for a second signal as transmitted by said wireless terminal;
generating a first multi-dimensional probability distribution for the location of said wireless terminal based on said first signal measurement;
generating a second multi-dimensional probability distribution for the location of said wireless terminal based on a comparison of said second signal measurement to a predicted value of said second signal measurement; and
estimating the location of said wireless terminal based on
    (i) said first multi-dimensional probability distribution, and
    (ii) said second multi-dimensional probability distribution;
wherein estimating the location of said wireless terminal comprises:
pruning a first list of candidate locations for said wireless terminal to a second list of candidate locations of said wireless terminal based on said first signal measurement; and
choosing an estimated location for said wireless terminal based on said second list of locations and said second signal measurement.

2. A method comprising:
receiving
    (i) a first signal measurement for a first signal as received by a wireless terminal, and
    (ii) a second signal measurement for a second signal as transmitted by said wireless terminal;
generating a first multi-dimensional probability distribution for the location of said wireless terminal based on said first signal measurement;
generating a second multi-dimensional probability distribution for the location of said wireless terminal based on a comparison of said second signal measurement to a predicted value of said second signal measurement; and
estimating the location of said wireless terminal based on
    (i) said first multi-dimensional probability distribution, and
    (ii) said second multi-dimensional probability distribution;
wherein estimating the location of said wireless terminal comprises:
pruning a first list of candidate locations for said wireless terminal to a second list of candidate locations of said wireless terminal based on said second signal measurement; and
choosing an estimated location for said wireless terminal based on said second list of locations and said first signal measurement.

3. A method comprising:
receiving
    (i) a signal strength measurement for a first signal as received by a wireless terminal,
    (ii) a first time-of-arrival measurement for a second signal as received by said wireless terminal, wherein said second signal is transmitted by a first Earth satellite, and
    (iii) a second time-of-arrival measurement for a third signal as received by said wireless terminal, wherein said third signal is transmitted by a second Earth satellite,
matching said signal strength measurement against a database that associates locations with signal measurements to generate a first multi-dimensional probability distribution for the location of said wireless terminal;
generating a second probability distribution for the location of said wireless terminal based on said first time-of-arrival measurement and said second time-of-arrival measurement; and estimating the location of said wireless terminal based on:
(i) said first multi-dimensional probability distribution, and
(ii) said second multi-dimensional probability distribution;

wherein estimating the location of said wireless terminal comprises:

pruning a first list of candidate locations for said wireless terminal to a second list of candidate locations of said wireless terminal based on said second first time-of-arrival measurement and said second time-of-arrival measurement; and measurement;

choosing an estimated location for said wireless terminal based on said second list of locations and said signal strength measurement.

4. A method comprising:
receiving
(i) a signal strength measurement for a first signal as received by a wireless terminal,
(ii) a first time-of-arrival measurement for a second signal as received by said wireless terminal, wherein said second signal is transmitted by a first Earth satellite, and
(iii) a second time-of-arrival measurement for a third signal as received by said wireless terminal, wherein said third signal is transmitted by a second Earth satellite, matching said signal strength measurement against a database that associates locations with signal measurements to generate a first multi-dimensional probability distribution for the location of said wireless terminal;

generating a second probability distribution for the location of said wireless terminal based on said first time-of-arrival measurement and said second time-of-arrival measurement; and estimating the location of said wireless terminal based on:
(i) said first multi-dimensional probability distribution, and
(ii) said second multi-dimensional probability distribution;

wherein estimating the location of said wireless terminal comprises:

pruning a first list of candidate locations of said wireless terminal to a second list of candidate locations of said wireless terminal based on said signal strength measurement; and choosing an estimated location of said wireless terminal based on said second list of locations, said first time-of-arrival measurement, and said second time-of-arrival measurement.

* * * * *